Dec. 24, 1940.  M. R. HUTCHISON, JR  2,225,698

POWER TRANSMISSION DEVICE

Filed Feb. 8, 1939  5 Sheets-Sheet 1

INVENTOR
MILLER R. HUTCHISON JR.
BY
his ATTORNEY

Dec. 24, 1940.   M. R. HUTCHISON, JR   2,225,698
POWER TRANSMISSION DEVICE
Filed Feb. 8, 1939    5 Sheets—Sheet 2

INVENTOR
MILLER R. HUTCHISON JR.
BY
ATTORNEY

Dec. 24, 1940.     M. R. HUTCHISON, JR     2,225,698

POWER TRANSMISSION DEVICE

Filed Feb. 8, 1939     5 Sheets-Sheet 3

INVENTOR
MILLER R. HUTCHISON JR.
BY
his ATTORNEY

Dec. 24, 1940. M. R. HUTCHISON, JR 2,225,698
POWER TRANSMISSION DEVICE
Filed Feb. 8, 1939  5 Sheets-Sheet 4

INVENTOR
MILLER R. HUTCHISON JR.
BY
his ATTORNEY

Patented Dec. 24, 1940

2,225,698

UNITED STATES PATENT OFFICE 2,225,698

POWER TRANSMISSION DEVICE

Miller R. Hutchison, Jr., Rochester, N. Y., assignor, by mesne assignments, to Paul Kollsman, New York, N. Y.

Application February 8, 1939, Serial No. 255,202

20 Claims. (Cl. 74—64)

This invention relates to power transmission systems, more particularly to devices for transmitting power from a first rotating to a second rotatable element.

It is an object of this invention to provide a mechanical power transmission mechanism capable of delivering torque from a driving to a driven member at various torque ratios in one or the opposite direction without the use of gears or other commonly used devices for multiplying torque.

It is an object of my invention to incorporate in a torque amplifying mechanism automatic means for changing from one torque ratio to another in response to variations in speed and load.

A further object of my invention is to combine in a unitary structure the two functions of providing various torque ratios and controlling the selection of ratio.

Yet another object of this invention is to provide torque amplifying and torque ratio controlling and selecting mechanism having elements of simple, rugged construction, assembled within a minimum of space and capable of functioning for extended periods without attention or objectionable wear.

A further object of this invention is to provide in a power transmission mechanism between rotating elements a driving connection affording a relatively large change of phase angle in either direction, without slipping, and providing torque multiplication upon the driven member in response to an increase in load, the mechanism being operable in either direction of rotation.

Yet another object of this invention is to provide between a rotating driving member and a rotatable driven member a mechanical reversible power transmission means permitting a relatively large phase displacement between the members in response to cyclically recurring drive or load conditions without causing objectionable torsional vibrations.

It is a further object of the present invention to provide in a power transmission mechanism, operable in one or the opposite direction of rotation, means permitting the normally driven member to overrun the driving member when its angular velocity exceeds that of the driving member.

A further object of my invention is to provide in a torque amplifying mechanism, such as a nut runner or rotary impact wrench for example, means cushioning the driving member against sudden changes in speed or load when the connection with the driven member is intermittently made and broken for the purpose of delivering torsional blows.

It is another object of my invention to provide a device capable of producing a rapid succession of rotary impacts against a driven member which may be stationary or turning more slowly than the driving member, said device being operable by a motor running at a substantially constant speed.

A further object of the present invention is the provision of an impact tool for imparting torsional force to work engaged by the tool, embodying novel means for increasing the torque of the impacts over the torque capacity of the driving member.

A still further object of my invention is to increase the efficiency of a torsional impact tool by eliminating retardation of the striking member between successive engagements thereof with the stricken member.

Another object of my invention is to provide a reversible power transmission mechanism between a rotating driving member and a driven member permitting the former when starting from rest quickly to attain normal running speed independently of the acceleration of the driven member, and to limit to a safe value the load sustained by the driving member independently of the load imposed upon the driven member.

A further object of my invention is to provide means, whereby the magnitude of torque transmitted between a driving and driven member may be determined.

It is a further object of this invention to provide a power transmitting device or coupling between a driving and driven rotatable element permitting a relative slip between them upon an increase in the load applied to the driven element above a predetermined magnitude.

Another object of my invention is to provide a torque transmitting connection between rotatable elements for transmitting a torque which is proportional to the square of the rotative speed of the driving element.

Further aims and objects of this invention will appear from a consideration of the description which follows with accompanying drawings showing for purely illustrative purposes embodiments of my invention. It is to be understood, however, that the description is not to be taken in a limiting sense, the scope of this invention being defined in the appended claims.

Referring to the drawings.

Basic structure and operating principles of my mechanical power transmission mechanism are illustrated and may be understood from the following exposition.

Figure 1:
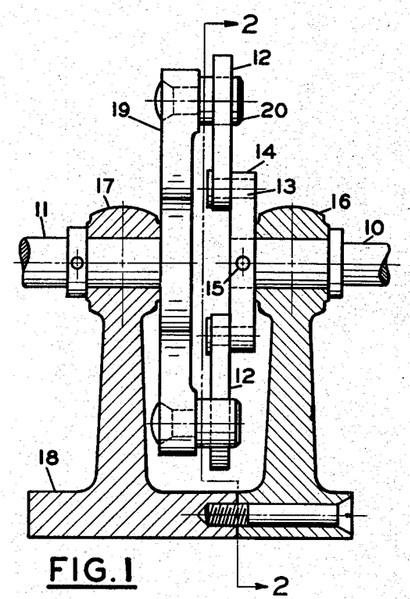
Fig. 1 is an elevation, partly in section, of a power transmission device embodying this invention.
Figure 2:
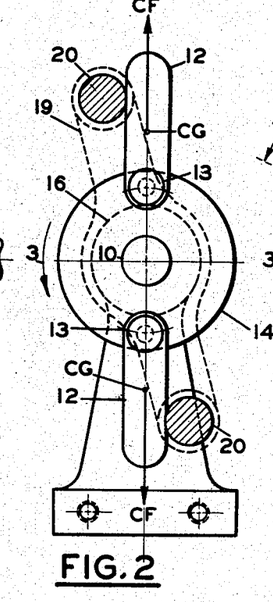
Fig. 2 is a section taken on line 2—2 of Fig. 1.

Between a driving member 10 which, for example, may be the armature shaft of an electric motor, and a driven member 11 there is located the torque amplifying means and control mechanism of the present invention as shown by Figs. 1 and 2.

Basically the device consists of the combination with a driving and a driven member of an energy storing member, the connections between the members being such that the connection to the driven member is temporarily broken when the torque required by the driven member exceeds a predetermined value, this value being a function of the rotative speed of the driving member.

In the drawings, I have shown as an energy storing means one or more movable arms 12, preferably of hardened steel and rectangular in cross section, journalled at one end on a suitable pivot or pin 13, which is firmly supported in a flange 14 forming a part of the driving member to which it is secured by a pin 15. Driving and driven members are journalled in alignment by bearing pedestals 16 and 17, extending from a base 18. The driven member 11 embraces one or more arms 19 at the ends of which are supported a corresponding number of individual projections shown as studs 20 preferably also of hardened steel. The studs are equidistantly spaced from one another, parallel to the axis of the driving member, and are so arranged as to lie within the compass of the movable arms 12 as these swing about their supporting pivots during rotation of the driving member.

It will be apparent that rotation of the driving member about its axis will cause the arms 12 to swing outward in response to centrifugal force CF acting upon them at their center of gravity CG, and that the arms will come into contact in driving relation with the studs. Fig. 2 shows the relative position of the parts upon rotation of the driving member in the direction indicated by the arrow 3 when no resistance to turning is offered by the driven member.

Figure 3:
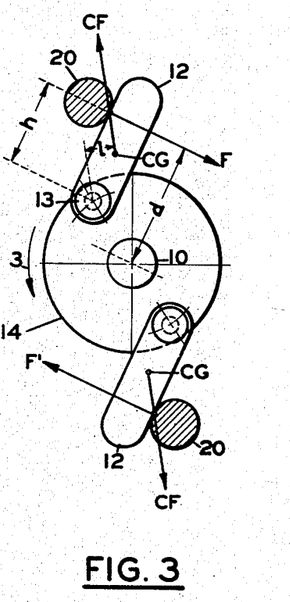
Figs. 3 to 6 illustrate various phases in the operation of the device shown in Figs. 1 and 2.

If a load is applied to the driven member, the parts will assume a position similar to that shown in Fig. 3 in which accessory parts are omitted for the sake of clearness. Under a load the arms are forced inwardly by the reaction force exerted upon them by the studs, the contact force being indicated by the vector F, against the action of centrifugal force represented by vector CF. If the couple $F \times h$ equals the couple $CF \times l$, the mechanism is in running equilibrium, transmitting from the driving to the driven member a torque.

Figure 4:
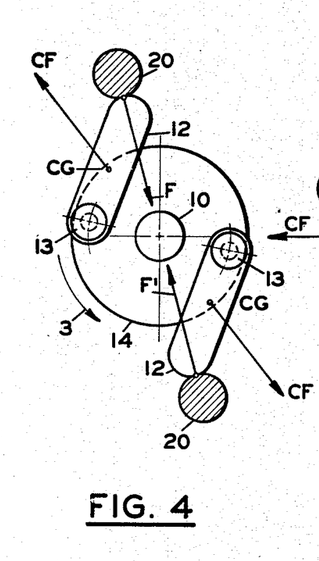

If the resistance by the driven member is further increased, the parts of the mechanism will assume the position shown in Fig. 4 in which the arms have been forced still further inwardly. The passage of the contact force vector F through the axis of rotation connotes an absence of torsional reaction by the driven member upon the driving member and indicates that the parts in this position are out of equilibrium. Consequently, in this view, the driving member is moving ahead of the driven member, and the arms are about to pass clear inside the studs.

Figures 5, 6:
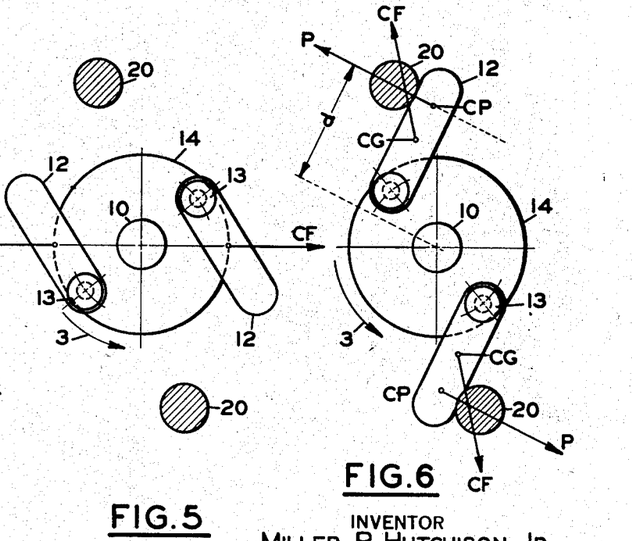

Immediately after clearing the studs, the arms will assume a position which is shown in Fig. 5. The arms are seen to be moving outwardly, in response to centrifugal force. By this action, and through acquiring angular velocity about their respective pivots and about the axis of rotation of the driving member, the arms absorb or store up energy derived from the driving motor during the period of disengagement with the studs. As, in the absence of friction or other retardation caused for example by guiding surfaces associated with the driven member, the arms are free to move under action of centrifugal force, a maximum of efficiency is obtained. Furthermore, it is apparent that the described action of the arms results in a substantially even load on the driving motor during the phases of engagement as well as disengagement between arms and studs.

Figure 6 shows the position of the parts at the end of the energy-accumulation period, at which time the arms once more come into contact with the studs. If the speed difference between driving and driven members is slight at this time, the arms will strike a gentle blow, if the difference is great, a very powerful one. The force of the blow also depends upon the resistance offered by the driven member, being less as the load is more yielding. Such blows effectively deliver torsional impacts, the contact force vector F being directed at a distance $d$ from the pivotal axis.

The arms on striking the studs forcibly will rebound therefrom, since the materials of which the parts are made possess resilience. This rebound in the present invention is usefully employed to free the arms from frictional engagement with the studs, inside of which the arms must pass on their way to the following impact position, causing them to turn sufficiently far about their supporting pivots to prevent centrifugal force restoring them to a frictional position with respect to the studs during the short interval in which the arms are adjacent thereto. In this way, mechanical efficiency of the device is further improved.

In many instances it may be desirable to avoid reaction on the driving motor caused by the blows of the arm or arms striking the projections on the driven member. This may be accomplished by spacing the projections or studs from the pivotal axes of the arms by such a distance that the reaction force exerted by the projection on the arm passes through the center of percussion of the arm. The center of percussion, as is well known, is the point of a suspended body in which the mass of the suspended body may be regarded as concentrated. Thus, if a pendulous body is struck by a force directed at its center of percussion, no reaction will occur at the point of suspension. In Fig. 6 the center of percussion is designated by CP.

The contact force passes through the center of percussion CP of the arm at the instant of striking. The arm is a suspended body subject to the action of centrifugal restoring force and, accordingly, when struck in this way, is subject to no reaction at the axis of suspension. Inasmuch as the arm can only exert a force upon the driving member through its suspension, the driving member is thus not disturbed by the occurrence of the impact or blow.

The maximum torque consumed by the driven member is the torque necessary to accelerate the arms while they are disengaged from the driven member. This property of the mechanism prevents overloading or stalling of the driving motor operating a power transmission device embodying the present invention.

As it appears from Figs. 2 and 3, the device functions as a flexible coupling through a relatively large amplitude. If the load corresponding to Fig. 3 is reduced, the arms will from this position move toward that shown by Fig. 2 without slip occurring between the connected members; and vice versa. The amplitude represented may exceed 40° in the design shown, the resistance of the coupling being a function of the rotative speed. The torque transmitted at any time is influenced by the inclination of the arms with respect to their radial position, such inclination determining the tangential or driving component of the contact force F. When the vector F passes through the axis of rotation of the driving member, which occurs at a phase angle of approximately 80° in the illustrated embodiment, the tangential component becomes nil, and no torque is transmitted to the driven member. Between no-load and full-load positions the variation in torque is a non-linear function of the phase angle between the connected members.

Frictional resistance between the movable members results in an effective damping of the coupling which thus becomes to a remarkable degree devoid of natural periodicity and of objectionable torsional vibrations.

Figures 7, 9:
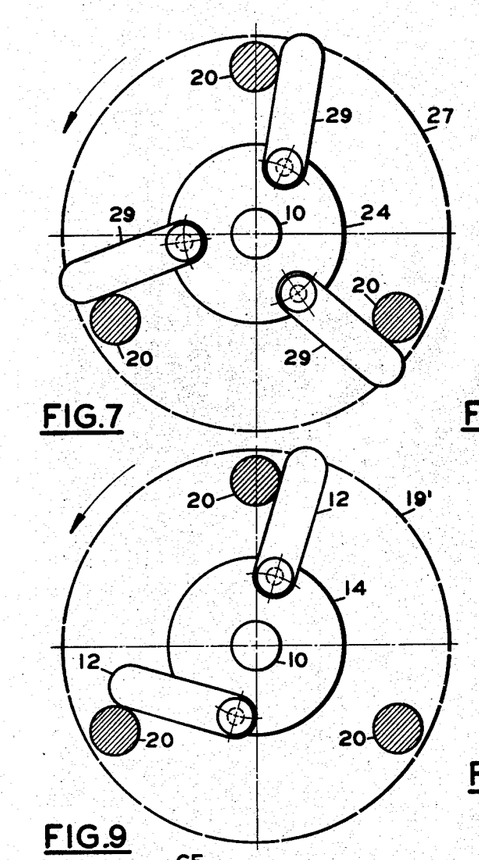
Figs. 7 to 10 illustrate modified forms of the invention.

When the primary function of my power transmission system is to deliver rotary impacts, as in a nut runner or impact wrench, I prefer to employ, as illustrated by Fig. 2, a pair of arms and studs, such being the least number of parts which will give dynamic balance in running. The mechanical output of the motor then is resolved into two rotary impacts per revolution of the driving relatively to the driven member. If a greater number of parts is used, for example three arms and three studs, as shown in Fig. 7, the motor output is resolved into a greater number of impacts per revolution, three in this example, but the intensity of the individual impact may be correspondingly lessened. This is easily understood when it is considered that the narrower the studs are spaced the less time there is for the arms to move into a radial position before striking the succeeding stud.

Figure 8:
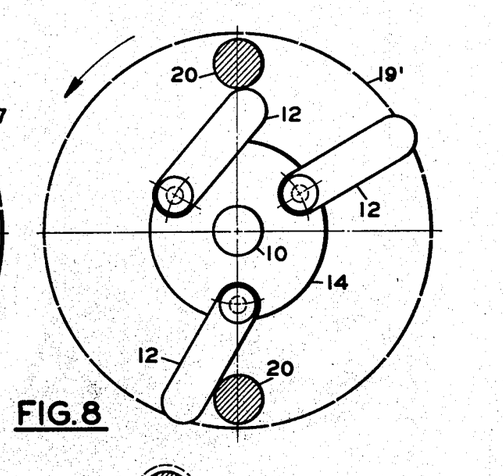

When the primary function of my invention is to provide continuous transmission of torque at various speed ratios, and to furnish a flexible coupling between a driving and a driven member at unitary ratio, I prefer to employ dissimilar numbers of arms and studs, as illustrated in devices of the simplest form by Figs. 8 and 9.

Figure 10:
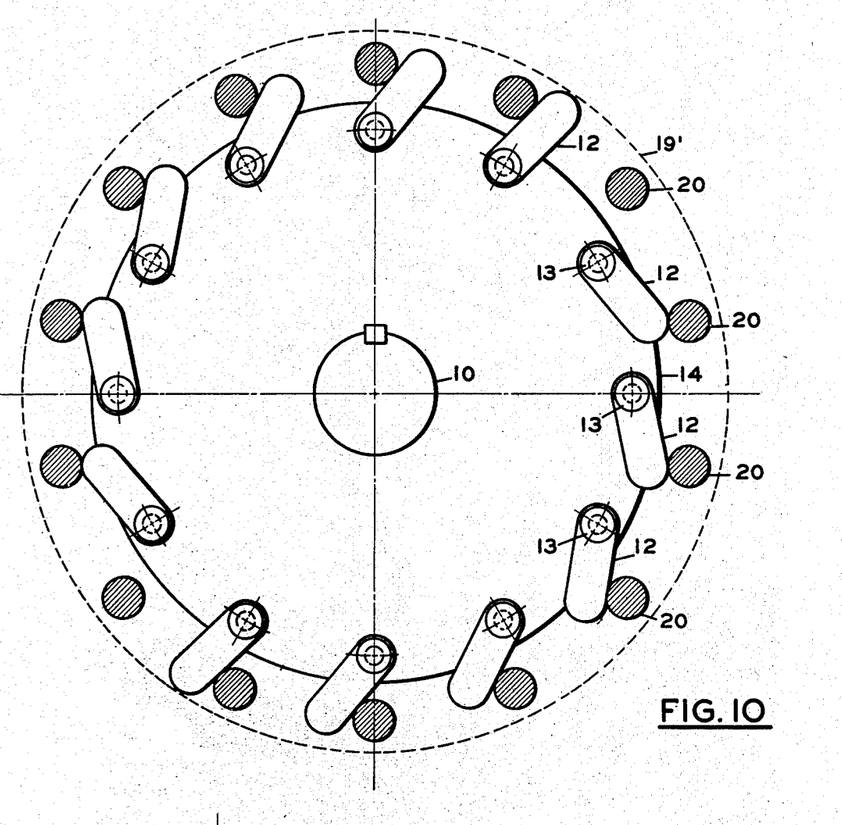

When it is required that power shall be transmitted with minimum torsional fluctuation to a driven member, I prefer to increase the number of driving parts, for example as indicated by Fig. 10, in order to secure a larger amount of overlapping action from them. In thus resolving the output of the driving motor into a larger number of impulses, individual blows incident to the normal functioning of the arms when slip occurs will less disturb the even flow of power between driving and driven members. By selecting appropriate numbers of arms and studs, unbalanced radial forces may be avoided altogether and the device made to run without reaction upon its main bearings and foundation.

Figure 11:
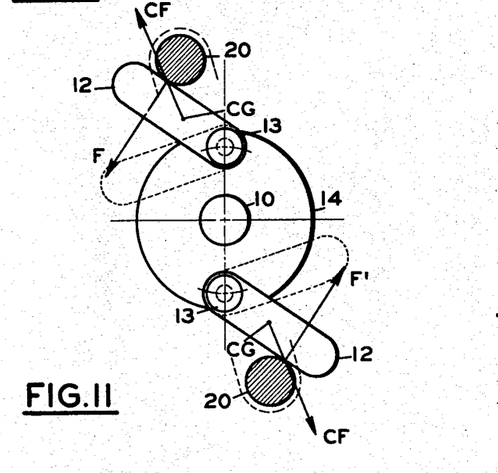
Figs. 11 and 12 show further phases in the operation of the device shown in Figs. 1 and 2.

Referring to Fig. 11, it will be evident that the driven member 11 may overtake the normally driving member 10, should the speed difference be reversed. If the driving member is at that time revolving, the arms will be held out by centrifugal force and when contacted by the studs of the overtaking driven member will present a resistance conditioned upon the speed of the driving member. Thus, power may temporarily be transmitted in the reverse of the usual direction, from driven to driving member, and be useful in sustaining the rotation of the driving member within the flexible coupling ability of my invention. Should the driving member be idle at such time, the driven member is little impeded as its studs will readily deflect the arms of the driver out of their path, as is indicated in dotted lines in Fig. 11. On resuming operation from such a condition, the driving member re-establishes the power transmission to the driven member in a normal fashion. The device operates equally well in either direction of rotation. It is thus possible to reverse the direction of the driven member by reversing the driving member.

It is sometimes required to determine the magnitude of a torque transmitted between co-axial rotating members. My invention may be usefully employed to this end as a shaft coupling, its relatively large useful deflection and aperiodic characteristics lending it to such use where accessory speed-indicating apparatus is at hand. For each phase angle of the coupling, there is a pre-determinable torque at each speed. Observation of phase angle, or inclination of coupling arms, is easily made by conventional means, and the result interpreted in terms of transmitted torque. Alternatively, the occurrence of slip may be taken as an index of torque, an audible indication of it being given by my invention.

Figure 12:
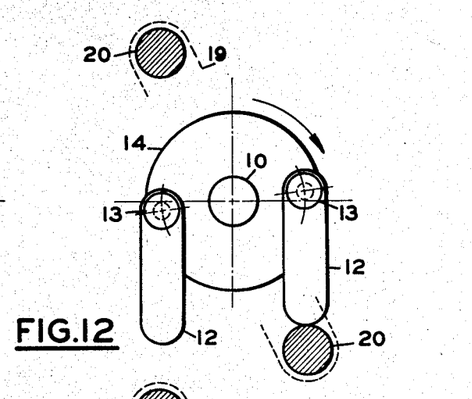
Figure 13:
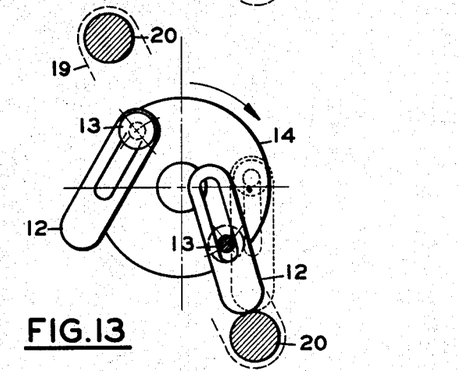
Fig. 13 illustrates a modified manner of mounting the movable arms of the device shown in Figs. 1 and 2.

Means may be provided to prevent an accidental jamming of the power transmission mechanism when the device is started up from rest. A condition under which jamming may occur is illustrated in Fig. 12. When at rest, the arms, responding to the pull of gravity, naturally hang downward. In starting from such a position, one arm may accidentally assume the position shown in this figure, thus establishing a unidirectionally rigid driving link between driving and driven members and inhibiting the normal action of the mechanism. To permit the arm to escape from this position, it may be mounted with freedom for translatory movement, for example by means of an elongated hole for engagement with its pivot, as illustrated by Fig. 13. Thus, the driving member is enabled to progress as the pivot moves in the elongated hole, thereby dislodging the arm from the stud and, as centrifugal force upon the arm subsequently comes into play, the arm quickly resumes its normal relation to the driving member. The elongation of the hole does not affect adversely the bearing between arm and pivot, since, as previously explained, the pivot has only to contend with centrifugal force action and is not acted upon by laterally or radially-inwardly directed forces.

Biasing means may also be provided normally maintaining the arms in a radial position when the device is at rest, thus counteracting gravitational force and effectively preventing jamming. In the embodiment illustrated in Figs. 14 to 18 about to be described biasing springs are shown. These springs, however, are not used for the purpose of storing energy of the driving motor, nor to accelerate the arms in swinging outward, but need in the present instance only be made powerful enough to extend the arm substantially radially against the pull of gravity when the device is at rest. The biasing springs are so weak as to have no measurable effect in other respects.

In Figs. 14 to 18 a practical embodiment of my invention is shown in the form of a rotary nut runner and torsional impact wrench. A motor shaft 101 provided with an integral gear 101a is journalled in a bearing 103 supported in a motor housing end plate 104. The gear 101a engages with a speed-reducing gear train comprising gears 105, 106, and 107. The gears 105 and 106 are mounted in anti-friction bearings 108 for rotation about a shaft 109 which, in turn, is mounted in a conventional manner in a motor housing end plate and gearcase housing 110. The gear 107 is press-fitted to an intermediate shaft 111 which it drives through a key 112, also holding in place an anti-friction bearing 113 which is mounted in the gearcase housing.

Figures 14, 16:
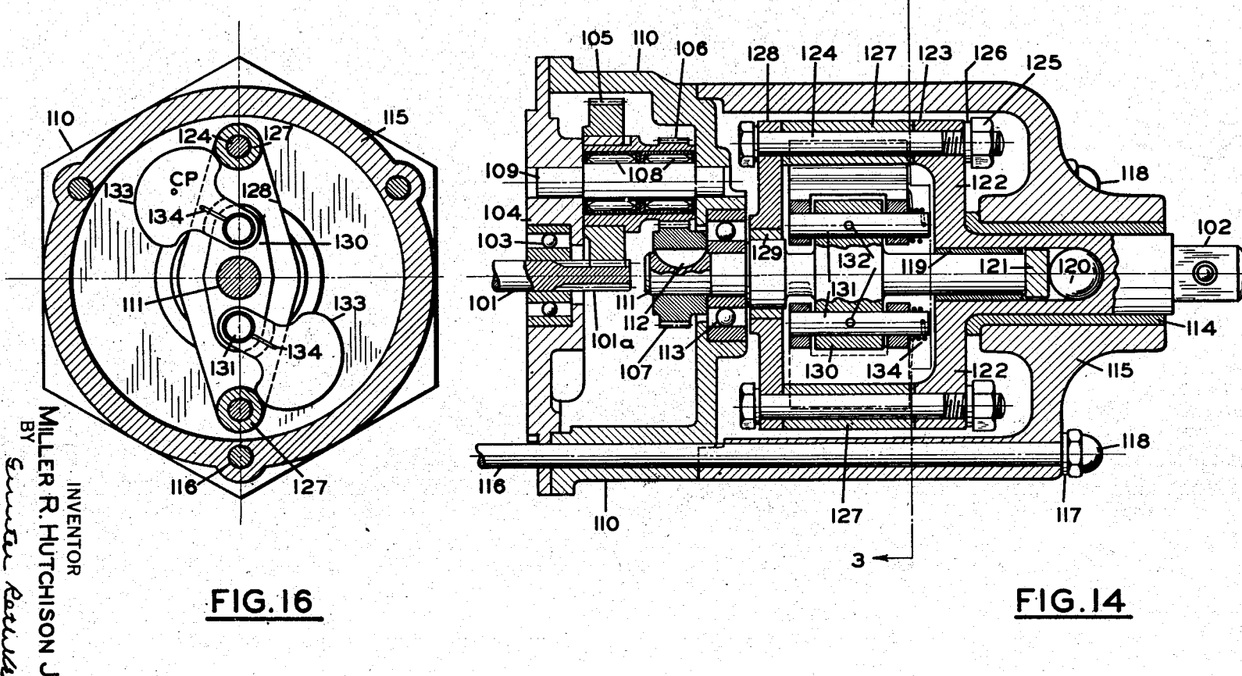
Fig. 14 is a longitudinal section of a rotary impact tool embodying the present invention and useful for nut running, tightening, and loosening.
Fig. 16 is a section taken on line 3—3 in Fig. 14.
Figure 15:
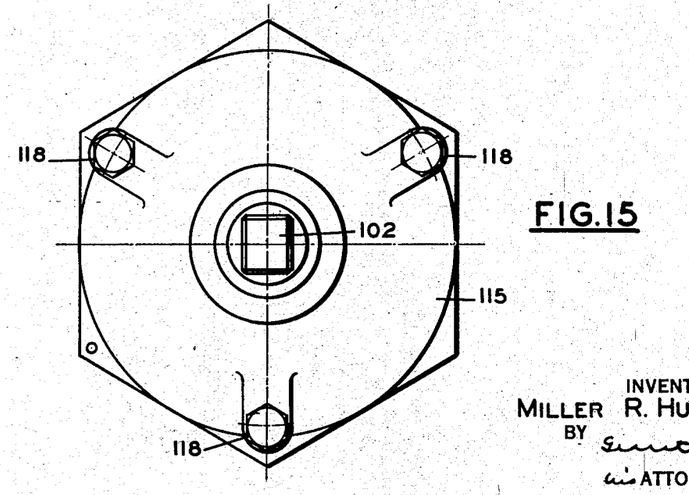
Fig. 15 is a front view of the device shown in Fig. 14.

A driven member 102 is journalled by a flanged bushing 114 mounted in a housing 115. The housing 115 pivots on the gearcase housing and is secured thereto by bolts 116, washers 117, and nuts 118. The bolts threadedly engage the motor housing, passing through holes provided in the gearcase housing. A bushing 119, concentric with the driven member and carried within it, journals the forward end of the intermediate shaft.

End thrust arising from the application to the work of a tool to be secured to the end of the shaft 102 is sustained by a thrust ball 120 bearing against a thrust plate 121, and transmitting the thrust through the intermediate shaft 111 and the bearing 113 to the housing 110. Formed integral with the driven member 102 are arms 122 extending laterally and terminating in lugs 123 through which pass bolts 124 secured by nuts 125 bearing on washers 126. The bolts are closely fitted in the lugs and carry hardened bushings 127. An end plate 128 completes the driven member to form a rigid cage held together by the bolts 124 which are firmly tightened so as to reduce play between the parts to a minimum and maintain proper alignment. The end plate is provided with a bushing 129 serving to journal the driven assembly upon the intermediate shaft adjacent to the gearcase bearing 113. Formed integral with the intermediate shaft 111 are oppositely disposed lugs 130 in which holes are formed, parallel to the shaft axis, equidistantly spaced, and into them are force-fitted pivot pins 131 which are secured in place by pins 132. The pivot pins journal preferably hammer-shaped arms 133 which, when extended, are adapted to engage with bushings 127 and, when contracted, to pass through the space between the bushings and the intermediate shaft. The hammer-like shape of the arms shown in Fig. 16 considerably augments the moment of inertia of the arms without, however, causing the impact force to deviate appreciably from the center of percussion.

For preventing jamming of the mechanism in the present embodiment, a biasing spring 134 is shown acting between the arm 133 and the respective pivot pin 131, as illustrated in Figs. 14 and 16. The pivot pin is for this purpose somewhat extended beyond the lug 123 to give support to the spring which may be of the safety-pin type. One end of the spring is secured to the pivot pin, the other end engages with the arm which thus is normally maintained in a substantially radial position against the force of gravity when the mechanism is idle.

In use, a socket wrench is fitted to the shaft 102 in a conventional manner. The wrench is applied to a nut to be tightened and the driving motor is started, running right-handedly. The motor torque is multiplied by the speed-reduction gear train and applied to the intermediate shaft. As the intermediate shaft revolves, for example at a speed of 700 revolutions per minute, centrifugal force acts upon the arms and causes them to engage the driven member. If the intermediate shaft torque is sufficient to overcome the running resistance of the nut, driving and driven members rotate in unison, and the nut quickly is run the length of the bolt projection and seated against the work. The increased resistance then encountered causes the arms automatically to disengage from the driven member, to store up motor energy, and to deliver that energy in a succession of powerful rotary blows. About 1400 blows per minute are delivered in the present example as during each revolution of the intermediate shaft the arms strike the driven member twice. The blows are transmitted to the work as torsional impacts through the driven member and wrench socket.

When a nut is to be loosened, the motor is started in a left-handed direction causing rotary impacts to be applied to the work until the screw fastening yields or the bolt breaks off. Thereafter, as the nut runs off, impacting will occur only as momentary resistance exceeds intermediate shaft torque, and the speed with which the nut is removed is governed only by the condition of the threads.

Figures 17, 19:
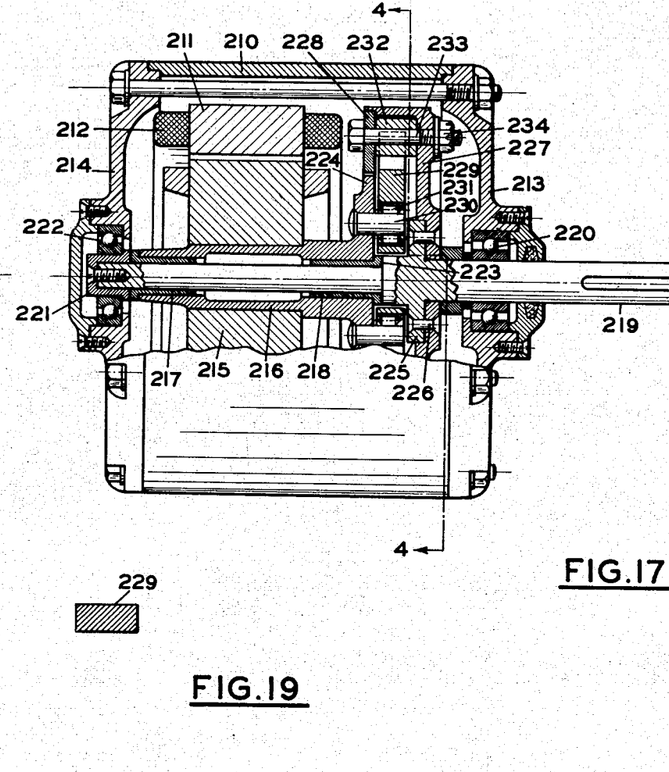
Fig. 17 is a side elevation, partly in section, of an embodiment of this invention used in connection with an electric motor.
Fig. 19 is a section taken on line 5—5 of an element of the device shown in Fig. 18.
Figure 18:
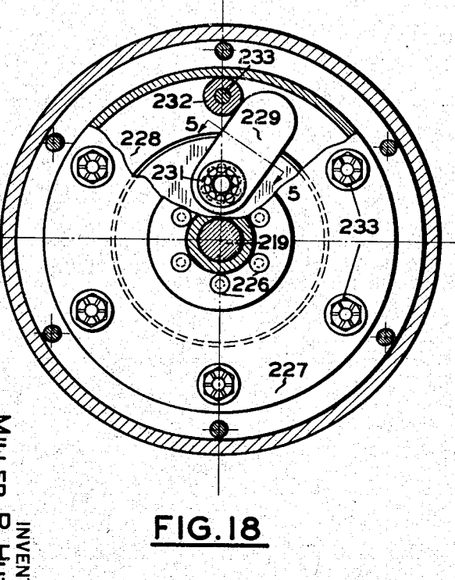
Fig. 18 is a section taken on line 4—4 in Fig. 17.

In Figs. 17 to 19 the invention is shown as applied for the purpose of limiting torque. Applied to an electric motor, the illustrated power transmission device permits the motor very quickly to acquire normal running speed after starting while maintaining the starting current within predetermined, safe limits. The device further acts as a flexible coupling of large amplitude and finally prevents overloading of the motor during operation.

A motor frame or casing 210 containing a field 211 energized by a winding 212 is closed by a front cover 213 and rear cover 214. An armature 215 is mounted for rotation within the field 211 by means of a hollow shaft 216 carried in bushings 217 and 218 for rotation with, or relatively to, a solid shaft 219. The front end of the solid shaft 219 is rotatable in an anti-friction bearing 220 mounted in the cover 213. The rear end of the shaft 219 is provided with a thimble 221 preventing axial movement of the bushing 217 relatively to the shaft 219. The thimble is carried in a second anti-friction bearing 222 mounted in cover 214. While the thimble prevents an axial movement of the hollow shaft 216 relatively to the solid shaft 219 in one direction, an axial movement in the opposite direction is prevented by means of the bushing 218 bearing against a shoulder 223 of the solid shaft.

The hollow shaft, to which the armature 215 is secured, is provided at its front end with a flange 224. To a flange 225 of the solid shaft 219 a drum 227 is secured in any suitable manner, as by means of rivets 226, the drum being suitably closed by means of a cover 228.

It thus appears that one rotatable member comprising an armature 215 and hollow shaft 216 carrying flange 224 is rotatable independently of the solid shaft 219 and associated drum 227 constituting the other rotatable member.

For the purpose of establishing a drive between the relatively rotatable members the flange 224, constituting a first rotatable member, is provided with one or several arms 229 mounted on said member for movement about an axis spaced from, and parallel with, the axis of rotation of the armature. In the illustrated embodiment there is provided a pivot pin 230 carrying the arm 229 which is of preferably rectangular cross-section and journalled on a needle bearing 231. The lever thus has freedom to assume a radial position with respect to the axis of rotation 219 under action of centrifugal force upon rotation of the armature.

The drum 227, constituting a second rotatable member, is provided with one or several individual projections extending into the circular path of the arm 229 rotating with the armature. In the illustrated embodiment the projections are shown as having the form of circular bushings 232 which may either be fixed or rotatable with respect to the drum. The bushing member is supported by a bolt 233 also serving to hold the cover 228 in place. The bolt is tightened by means of a nut 234.

The operation of the device shown in Figs. 17 to 19 will be understood from the previous exposition.

Obviously, the present invention is not restricted to the particular embodiments herein shown and described. Other forms of power transmission devices may be designed by mere modification of the illustrated devices, without departing from the spirit of the present invention.

What is claimed is:

1. A power transmission device comprising, in combination, a first member rotatable about a first axis; a movable arm mounted on said member about a second axis spaced from, and parallel with, said first axis with freedom to assume a radial position with respect to said first axis as well as to make angular movements with respect to said radial position; and a second rotatable member having an individual projection extending into the circular path of said arm rotating with said first member, said second member being so shaped as not to obstruct said arm except at said individual projection, whereby said first member will synchronously drive said second member through said arm bearing under action of centrifugal force against said projection, while upon loads applied to said second member and exceeding a predetermined magnitude for a certain rate of rotary motion impacts will be exerted on the latter by successive blows of said arm at said projection.

2. A power transmission device comprising, in combination, a first member rotatable about a first axis; a plurality of movable arms mounted on said member about second axes spaced from, and parallel with, said first axis with freedom to assume radial positions with respect to said first axis as well as to make angular movements with respect to said radial position; and a second rotatable member having individual projections extending into the circular path of said arms rotating with said first member, said second member being so shaped as not to obstruct said arms except at said individual projections, whereby said first member will synchronously drive said second member through said arms bearing under action of centrifugal force against said projections, while at loads applied to said second member and exceeding a predetermined magnitude for a certain rate of rotary motion impacts will be exerted on said second member by successive blows of said arms at said projections.

3. A power transmission device comprising, in combination, a first member rotatable about a first axis; a plurality of movable arms mounted on said member about second axes spaced from, and parallel with, said first axis with freedom to assume radial positions with respect to said first axis as well as to make angular movements with respect to said radial positions; and a second member rotatable coaxially with said first member and having individual projections extending into the circular path of said arms rotating with said first member, said second member being so shaped as not to obstruct said arms except at said individual projections, whereby said first member will synchronously drive said second member through said arms bearing under action of centrifugal force against said projections, while at loads applied to said second member and exceeding a predetermined magnitude for a certain rate of rotary motion impacts will be exerted on said second member by successive blows of said arms at said projections.

4. A power transmission device comprising, in combination, a member rotatable about a first axis; a movable arm of rectangular cross-section mounted on said member about a second axis spaced from, and parallel with, said first axis with freedom to assume a radial position with respect to said first axis as well as to make angular movements with respect to said radial position; a rotatable support; and a stud mounted on said support to extend into the circular path of said arm rotating with said member, whereby said member will synchronously drive said support through said arm bearing under action of centrifugal force against said stud, while upon loads applied to said support and exceeding a predetermined magnitude for a certain rate of rotary motion impacts will be exerted on said support by successive blows of said arm at said stud.

5. A power transmission device comprising, in combination, a member rotatable about a first axis; a plurality of movable arms of rectangular cross-section mounted on said member about second axes spaced from, and parallel with, said first axis with freedom to assume radial positions with respect to said first axis as well as to make angular movements with respect to said radial position; a rotatable support; and a plurality of studs mounted on said support to extend into the circular path of said arms to be engaged by one side of said arms bearing against the respective studs, whereby said member will synchronously drive said support by engagement of said arms and studs, while upon loads applied to said support and exceeding a predetermined magnitude impacts will be exerted on said support by successive blows of said arms at said studs.

6. A power transmission device comprising, in combination, a member rotatable about a first axis; a plurality of movable arms of rectangular cross-section mounted on said member about second axes spaced from, and parallel with, said first axis with freedom to assume radial positions with respect to said first axis as well as to make angular movements with respect to said radial position; a rotatable support; and a plurality of rollers rotatably mounted on said support to extend into the circular path of said arms to be engaged by one side of said arms bearing against the respective rollers, whereby said member will synchronously drive said support by engagement of said arms and rollers, while upon loads applied to said support and exceeding a predetermined magnitude impacts will be exerted on said support by successive blows of said arms at said rollers.

7. A power transmission device comprising, in combination, a first member rotatable about a first axis; a movable arm mounted on said member about a second axis spaced from, and parallel with, said first axis with freedom to assume a radial position with respect to said first axis as well as to make angular movements with respect to said radial position; and a second rotatable member having an individual projection extending into the circular path of said arm rotating with said first member, the projection being radially spaced from the axis of rotation of said second member so that, upon being struck by said arm, the contact force will be directed approximately through the center of percussion of said arm, whereby upon loads applied to said second member and exceeding a predetermined magnitude for a certain rate of rotary motion impacts will be exerted on said second member by successive blows of said arm at said projection with a minimum of reaction on said second axis of said first member.

8. A power transmission device comprising, in combination, a first member rotatable about a first axis; a movable arm mounted on said member about a second axis spaced from, and parallel with, said first axis with freedom to assume a radial position with respect to said first axis as well as to make angular movements with respect to said radial position; and a second member rotatable coaxially with said first member, said second member having an individual projection extending into the circular path of said arm rotating with said first member, the projection being radially spaced from said first axis by a distance approximately equal to the sum of the distance between the first and second axis plus the distance of the center of percussion of the said arm from said second axis, whereby upon loads applied to said second member and exceeding a predetermined magnitude for a certain rate of rotary motion impacts will be exerted on said second member by successive blows of said arm at said projection with a minimum of reaction on said second axis.

9. A power transmission device comprising, in combination, a member rotatable about a first axis; a plurality of movable arms of rectangular cross-section mounted on said member about second axes equally spaced from, and parallel with, said first axis with freedom to assume radial positions with respect to said first axis as well as to make angular movements with respect to said radial position; a support rotatable coaxially with said member; and a plurality of rollers rotatably mounted on said support to extend into the circular path of said arms to be engaged by one side of said arms bearing against the respective rollers, the rollers being radially spaced from said first axis by a distance approximately equal to the sum of the distance between the first and second axis plus the distance from the center of percussion of said arms from said second axis, whereby upon loads applied to said second member and exceeding a predetermined magnitude impacts will be exerted on the latter by successive blows of said arms at said rollers with a minimum of reaction on said second axes.

10. A power transmission device comprising, in combination, a member rotatable about a first axis; a plurality of movable arms of rectangular cross-section mounted on said member about second axes equally spaced from each other and parallel with said first axis with freedom to assume radial positions with respect to said first axis as well as to make angular movements with respect to said radial position; a support rotatable co-axially with said member; and a plurality of studs of equal number as there are arms mounted on said support equally spaced from each other to extend into the circular path of said arms to be engaged by one side of said arms bearing against the respective studs, the studs being radially spaced from said first axis by a distance approximately equal to the sum of the distance between the first and second axis plus the distance from the center of percussion of said arms from said second axis, whereby upon loads applied to said second member and exceeding a predetermined magnitude impacts will be exerted on the latter by successive blows of said arms at said studs with a minimum of reaction on said second axes.

11. In a power transmission device a first and a second support mounted for rotation about a first axis relatively to each other; a movable arm mounted on said first support for rotation about, and translatory movement in the direction of its longitudinal axis relatively to, a second axis spaced from, and parallel with, said first axis; and an individual projection on said second support extending into the circular path of said arm rotating with said first member.

12. In a power transmission device a first and a second support mounted for rotation about a first axis relatively to each other; a pivot pin mounted on said first support spaced from, and parallel with, said first axis; a movable arm having a longitudinally elongated hole mounted on said first support by engagement of said hole with said pin; and an individual projection on said second support extending into the circular path of said arm rotating with said first member.

13. In a power transmission device a first and a second support mounted for rotation relatively to each other; a movable arm mounted on said first support for rotation about a second axis spaced from, and parallel with, said first axis; resilient means for biasing said arm towards a radial position with respect to said first axis, in opposition to the force of gravity acting on the arm; and an individual projection on said second support extending into the circular path of said arm rotating with said first member, whereby the arm is maintained in a position to engage said projection while said supports are at rest.

14. A power transmission device comprising, in combination, a member rotatable about a first axis; a plurality of movable arms mounted on said member about second axes equally spaced from, and parallel with, said first axis with freedom to assume radial positions with respect to said first axis as well as freedom to make angular movements with respect to said radial position; a rotatable support; and a plurality of individual projections on said support of dissimilar number than there are arms, said projections extending into the circular path of said arms rotating with said member, said support being so shaped as not to obstruct said arms except at said individual projections.

15. A power transmission device comprising, in combination, a member rotatable about a first axis; a plurality of movable arms mounted on said member about second axes equally spaced from, and parallel with, said first axis with freedom to assume radial positions with respect to said first axis as well as freedom to make angular movements with respect to said radial position; a support rotatable coaxially with said first axis; and a plurality of individual projections on said support of dissimilar number than there are arms, said projections extending into the circular path of said arms rotating with said member, said support being so shaped as not to obstruct said arms except at said individual projections.

16. A device of the character described comprising, in combination, a casing; a first shaft adapted to be driven by a rotary motor, said first shaft being mounted in said casing; a plurality of movable arms pivotally connected to said first shaft about pivotal axes spaced from, and parallel with, the axis of said first shaft with freedom to assume radial positions with respect to said first shaft under action of centrifugal force; a second shaft adapted to receive a rotary tool, said second shaft being mounted in said casing coaxially with said first shaft; and a cage enclosing said arms, said cage including a plurality of parallel bars spaced from said second shaft and within the circular path of the extended arms, said cage being connected to rotate said second shaft.

17. A device of the character described comprising, in combination, a casing; a first shaft adapted to be driven by a rotary motor, said first shaft being mounted in said casing; a plurality of movable hammer-shaped arms pivotally connected to said first shaft about pivotal axes spaced from, and parallel with, the axis of said first shaft with freedom to assume radial positions with respect to said first shaft under action of centrifugal force; a second shaft adapted to receive a rotary tool, said second shaft being mounted in said casing coaxially with said first shaft; and a cage enclosing said arms, said cage including a plurality of parallel bars spaced from said second shaft and within the circular path of the extended arms, said cage being connected to rotate said second shaft.

18. A device of the character described comprising, in combination, a casing; a first shaft adapted to be driven by a rotary motor, said first shaft being mounted in said casing; a plurality of movable arms pivotally connected to said first shaft about pivotal axes spaced from, and parallel with, the axis of said first shaft with freedom to assume radial positions with respect to said first shaft under action of centrifugal force; a spring associated with each of said arms of sufficient power to maintain said arm in a radially extended position against the action of gravity when the device is at rest; a second shaft adapted to receive a rotary tool, said second shaft being mounted in said casing coaxially with said first shaft; and a cage enclosing said arms, said cage including a plurality of parallel bars spaced from said second shaft and within the circular path of the extended arms, said cage being connected to rotate said second shaft.

19. A device of the character described comprising, in combination, a casing; a first shaft mounted in said casing; a spaced reduction gear connected to drive said first shaft; a plurality of movable arms pivotally connected to said first shaft about pivotal axes spaced from, and parallel with, the axis of said first shaft with freedom to assume radial positions with respect to said first shaft under action of centrifugal force; a second shaft adapted to receive a rotary tool, said second shaft being mounted in said casing coaxially with said first shaft; and a cage enclosing said arms, said cage including a plurality of parallel bars spaced from said second shaft and within the circular path of the extended arms, said cage being connected to rotate said second shaft.

20. A device of the character described comprising, in combination, with an electric motor having an armature shaft; a plurality of movable arms pivotally connected to said armature shaft about pivotal axes spaced from, and parallel with, the axis of the armature shaft with freedom to assume radial positions with respect to said shaft under action of centrifugal force; a second shaft mounted coaxially with said armature shaft; and a cage enclosing said arms, said cage including a plurality of parallel bars spaced from said second shaft and within the circular path of the extended arms, said cage being connected to rotate said second shaft.

MILLER R. HUTCHISON, Jr.